US009607493B2

(12) United States Patent
McClain et al.

(10) Patent No.: US 9,607,493 B2
(45) Date of Patent: Mar. 28, 2017

(54) PORTABLE SECURITY SYSTEM

(71) Applicants: Bryan Ulrich McClain, San Mateo, CA (US); Demetrius Madrigal, San Jose, CA (US); Daniel Nicholas Peknik, Pacifica, CA (US); Michael Hill, Daly City, CA (US)

(72) Inventors: Bryan Ulrich McClain, San Mateo, CA (US); Demetrius Madrigal, San Jose, CA (US); Daniel Nicholas Peknik, Pacifica, CA (US); Michael Hill, Daly City, CA (US)

(*) Notice: Subject to any disclaimer, the term of this patent is extended or adjusted under 35 U.S.C. 154(b) by 0 days.

(21) Appl. No.: 15/071,193

(22) Filed: Mar. 15, 2016

(65) Prior Publication Data

US 2016/0275765 A1 Sep. 22, 2016

Related U.S. Application Data

(60) Provisional application No. 62/133,980, filed on Mar. 16, 2015.

(51) Int. Cl.

| | |
|---|---|
| ***G08B 13/14*** | (2006.01) |
| ***H01H 9/00*** | (2006.01) |
| ***G08B 17/06*** | (2006.01) |
| ***G01L 9/00*** | (2006.01) |
| ***G08B 25/10*** | (2006.01) |
| ***G08B 5/36*** | (2006.01) |

(52) U.S. Cl.
CPC ........... *G08B 13/1445* (2013.01); *G08B 5/36* (2013.01); *G08B 25/10* (2013.01)

(58) Field of Classification Search
None
See application file for complete search history.

(56) References Cited

U.S. PATENT DOCUMENTS 8,205,640 B2 * 6/2012 Kawamura ............. F04B 17/04 137/516.25
2006/0125613 A1 * 6/2006 Ko ...................... B60C 23/0408 340/447
2009/0270843 A1 * 10/2009 Saxena ............... A61M 1/0009 604/543
2013/0098941 A1 * 4/2013 Wegelin .............. B05B 11/0037 222/23
2013/0187020 A1 * 7/2013 Trotsky .................. F16M 11/10 248/309.3

* cited by examiner

*Primary Examiner* — Joseph Feild
*Assistant Examiner* — Pameshanand Mahase
(74) *Attorney, Agent, or Firm* — Phillip M. Wagner

(57) ABSTRACT

An apparatus embodiment includes a security module having a guard frame, a dome slidably engaged with the guard frame, and an alarm system inside the dome. The alarm system includes a controller and a radio frequency transceiver. The security module further includes a suction cup coupled to the dome, a valve in fluid communication with the suction cup and electrically connected to the controller, and a suction cup in fluid communication with the valve. An embodiment may further include a client application including software instructions for arming the alarm system, disarming the alarm system, and opening the valve. The security module may autonomously seek and/or link with another security module, thereby forming an ad hoc communications network to protect an object tethered to the security module by a wireless communications link and/or a security cable.

20 Claims, 10 Drawing Sheets

Section A-A

Section A-A

Alternative Section A-A

PORTABLE SECURITY SYSTEM

CROSS REFERENCE TO RELATED APPLICATIONS

This application claims the benefit of U.S. Provisional Patent Application No. 62/133,980, filed Mar. 16, 2015, incorporated herein by reference in its entirety.

FIELD OF THE INVENTION

Embodiments relate generally to portable apparatus for deterring removal of an object to be protected and more specifically to a portable security device adapted to be firmly attached to a smooth surface and further adapted to send and receive alarm messages over a wireless communications network.

BACKGROUND

Laptop computers, smart phones, tablet computers, and other valuable objects may be misplaced or lost to theft. Or, portable equipment intended for use at a job site or workstation may be moved and may not be available when and where needed. Various restraint and security devices have been offered to deter theft, prevent loss, or keep equipment close to a preferred location. For example, some laptop computers, tablet computers, and other equipment are provided with a security slot adapted to receive a security connector attached to a flexible steel security cable. A pin or post extending from the security connector may be engaged with the security slot and the security cable attached to a table leg, armrest, railing, or other strong structure to deter removal of the object to be protected. Alternatively, a pin or post may be attached to the object to be protected and a receiver for the pin or post provided in the security connector on the security cable. However, a security cable may be ineffective when there is no nearby structure to which the security cable can be looped around, locked, or otherwise secured. For example, modular workstations found in some offices, libraries and airports lack legs or other structures or apertures which might be used for attachment of a security cable.

Some security cables include an audible alarm system that sounds when an attempt is made to detach the security connector from a security slot without first disarming the alarm system, possibly with a key or by entering a combination on a keypad or combination lock. Some security cables with a security connector have another connector that attaches to an alarm box secured to a wall or other fixed structure. Detaching the cable from the protected object or the connector from the alarm box may cause an audible, and possibly a visual, alarm indication from the alarm box. Such alarm indications are most useful for deterring unauthorized removal of a protected object when someone is close enough to perceive the alarm indication and takes action to prevent removal of the protected object. Security systems that depend on a stationary alarm box may not be suitable for protecting laptops and other objects that may be used or stored in locations where an alarm box is not available, for example an airport or library, and may interfere with the portability of a laptop or other personal electronic device.

SUMMARY

An example of an apparatus embodiment includes a security module having a guard frame; a dome slidably engaged with the guard frame; and an alarm system coupled to the dome. The alarm system includes a controller and a radio frequency transceiver connected for data communication with the controller. The security module further includes a suction cup coupled to the dome; a valve in fluid communication with the suction cup and electrically connected to the controller; and a suction cup in fluid communication with the valve. The example of an apparatus embodiment further includes a client application comprising software instructions for arming the alarm system, disarming the alarm system, and opening the valve. The security module may autonomously seek and/or link with another security module, optionally forming an ad hoc communications network when communication between security modules is established.

A displacement of the dome toward a bottom surface of the guard frame extends a bottom edge of the suction cup outward from the bottom surface of the guard frame. A displacement of the dome away from the bottom surface of the guard frame retracts the suction cup into the guard frame. The valve closes when the suction cup seals against a smooth surface. The valve opens when the suction cup releases a suction grip against a smooth surface.

The controller transmits an alarm message over the transceiver when the alarm system is armed and the valve opens. The alarm system further includes a visual alarm indicator electrically connected to the controller; and an audible alarm transducer electrically connected to the controller. The controller activates the visual alarm indicator and/or the audible alarm indicator when the alarm system is armed and the valve opens. The controller may also activate the visual alarm indicator and/or the audible alarm indicator when the controller receives an alarm message from the transceiver. The alarm message received by the transceiver may have been sent by another security module, by a client application running on a client system communicating with the security module, or possibly from another communications-enabled device.

The security module further includes a voltage conversion and regulation circuit electrically connected to the controller. The voltage conversion and regulation circuit includes a secondary coil adapted to receive inductively coupled power from an inductive charger. An embodiment optionally further includes an inductive charger.

The security module may further include an optical isolator electrically connected to the controller and a solenoid driver electrically connected to the optical isolator and to the valve. The valve may open and close in response to signals sent from the controller through the optical isolator and the solenoid driver.

The controller in the security module may transmit over the transceiver an alarm message received from another security module.

The client application may include a connect activator for establishing secure communications with a selected one of the security module. The client application may include an alarm system activator for arming the alarm system and an activator for silencing an alarm. The client application may further include a local alarm message indication and a remote alarm message indication.

The security module may include a flexible security cable attached to the guard frame. The security cable may further include a security connector adapted to couple to a corresponding security slot on an object to be secured. An apparatus embodiment with a security cable may further include an adapter plate having an adhesive pad for attaching the adapter plate to an object to be protected. The adapter plate is preferably formed with a security slot adapted to receive the security connector. A security cable may include a cradle adapted for securely holding a portable electronic device such as a tablet computer or smart phone.

DESCRIPTION

Figure 1:
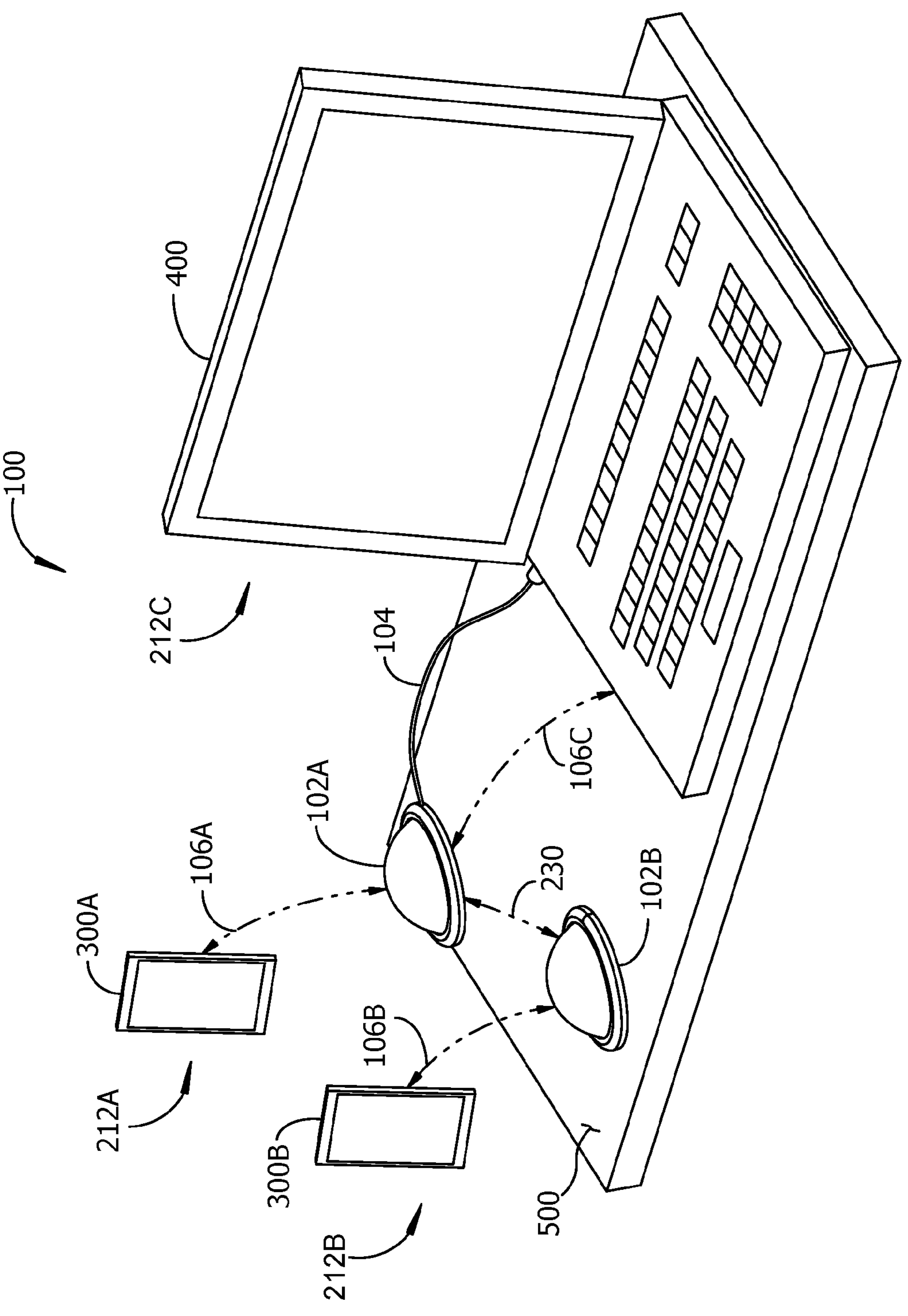
FIG. 1 shows a laptop computer as an example of an object to be protected from loss or theft by an example of a security system in accord with an embodiment, including a security module and an optional client device running a client application.

An apparatus in accord with an embodiment includes a security module having an alarm system, a bidirectional wireless communication interface for communicating with other security modules and with an optional client device, and an optional security cable with an optional security connector for removable attachment to an object to be protected. The security module includes a suction cup capable of holding very firmly to a smooth surface such as a table top, window, cabinet, door, or other surface capable of sustaining an airtight seal against the suction cup. The suction cup is well protected within a guard frame to discourage unauthorized removal of the security module from the surface gripped by the suction cup. The security module may activate audible and visible alarm indicators and transmit an alarm message over a wireless communications network when the security module is detached from the surface gripped by the suction cup while the alarm system is enabled. The security module may activate an alarm indicator when a wireless communications link between the security module and an object to be protected is interrupted.

A security module may exchange alarm messages and other information with a paired client device and with other security modules. The security module may establish communications with a client device over a wireless communications link, enabling operational control and monitoring of the security module from the client device, for example arming and disarming the alarm system in the security module, activating audible and visual alarm indicators, monitoring alarm system and battery status, and so on. The security module may further establish bidirectional wireless communications with other security modules operating within communication range, forming an ad hoc communication network of security modules able to exchange operational commands and status messages with each other. The ad hoc wireless communications network may optionally be implemented as a peer-to-peer network.

An alarm message generated by a security module preferably propagates to all other security modules and client devices participating in an ad hoc communications network. A security module receiving a message from the network may retransmit the message to other security modules in the network. A security module may communicate alarm and status messages, including messages originating in the security module and messages received from other security modules, with a client application on a client device paired with the security module. A security module receiving an alarm message from the network or from the client device paired with the security module may activate its own audible and visible alarm indicators. For example, the controller may activate the visual alarm indicator and/or the audible alarm indicator when the alarm system is armed and the valve coupled to the suction cup opens in response to the suction grip of the suction cup being interrupted.

The suction cup for attaching a security module to a smooth surface is coupled for fluid communication with a latching solenoid valve monitored and controlled by a controller in the security module. The controller includes a central processing unit (CPU) in data communication with a solenoid driver for selectively opening and closing the latching solenoid valve. The controller may autonomously arm the alarm system in the security module when the suction cup is compressed against a smooth surface, then inform the client device and other security modules in the network that the security system is active. Alternatively, the client application may arm the alarm system when the client device receives a status message from the security module indicating that the suction cup has been attached to a smooth surface. An armed security module is ready to indicate an alarm condition and may transmit an alarm message if the security module is removed from the surface to which it is attached. For example, an alarm message may be transmitted by the controller over the wireless communications link when the valve opens after the alarm system is armed, the open valve indicating the suction cup is not holding against a surface with a suction grip.

Alarm messages may be transmitted by an armed security module for other reasons including, but not limited to, interruption of a wireless communications link between the security module and an object being protected, an alarm message originating from a paired client device, and an alarm message received from the network and originating from a client device paired with another security module in the ad hoc network. The CPU in the security module may disarm the alarm system and open the valve to release the suction cup's grip from a smooth surface in response to a message sent over the wireless communication link from the client device paired with the security module. Embodiments preferably resist attempts from any unpaired device to disarm the alarm system, inactivate the wireless link to the protected device, and/or release the suction cup's grip on a surface.

A security system in accord with an embodiment provides a means for social cooperation in deterring theft or loss of protected objects in places such as airports, restaurants, convention facilities, hospitals, classrooms, factories, office buildings, and other places where there may be a risk of theft or loss of a valuable object. When a security module issues an alarm message and generates audible and visible alarm indicators that are repeated by other security modules within communication range, persons nearby may naturally look around to locate the source of the alarm and may inform others of an attempt to remove a protected object, query persons near a source of a visible and/or audible alarm indication, contact security or law enforcement personnel, or take other action to prevent theft or loss of a protected object. Safety and security may be enhanced without any person interacting with any other nearby person until an alarm message is generated by a security system embodiment, possibly preventing loss, removal, misplacement, or theft of objects protected by a security system embodiment.

FIG. 1 illustrates an example of a security system 100 including a security module 102 tethered to an example of a protected device 400. A security module may be tethered to a protected device by a security cable mechanically attached to the security module and to the protected device, by a secure wireless data communications link between the security module and the protected device, or by both a security cable and a secure wireless data communication link. A security module may optionally be permitted to tether to more than one device simultaneously, for example a protected device and another client device.

In the example of FIG. 1, a security module 102A has established secure wireless data communication with a client device 300. The security module 102A may optionally participate in an ad hoc communications network 230 with at least one other security module 102B. The second security module 102B may optionally be tethered to another protected device or may alternatively operate as a repeater, sending and receiving alarm and other status messages to any security module in communication range, but not tethered to a protected device.

FIG. 1 further illustrates examples of tethering. After a secured wireless communications link 106 is established between a selected security module and a selected protected device 400, the link may optionally be inaccessible for communications between the security module and any unauthorized device. An example of tethering to protect a laptop computer is shown by a security module 102A coupled for secure data communications over a wireless communications link 106C and physically connected to the laptop by a security cable 104. Another example of tethering shows a smart phone 300B communicating with a security module 102B by a secure wireless data link 106B, but not connected by a security cable. A protected device 400 may be tethered by both a security cable 104 and a secure wireless data link 106C. A security cable 104 may optionally be provided as a visual deterrent to a would-be thief, the cable giving an indication that the protected device 400 may not be easy to carry away without attracting attention. Alternatively, embodiments may be provided without a security cable, employing the secure wireless data link 106 as a tether to the protected device, omitting any physical connection between the security module and protected device. Removing the security module from the surface 500 and/or interrupting the secure wireless data link 106 may trigger an alarm response by the security module.

In FIG. 1, a laptop computer is an example of a protected object 400. Other examples of a protected object 400 include, but are not limited to, a tablet computer, a smart phone, a hand tool, a measurement instrument such as a voltmeter or oscilloscope, a trolley, a cart, a wheelchair, a bicycle, sports equipment, a watercraft, a vehicle, an equipment rack or cabinet, a door or window on a vehicle, cabinet, or building, a reference book, and so on. A protected object may be referred to herein as a tethered object. It may be desirable to generate an alarm message and audible and/or visual alarm indications when a secure wireless data link between a tethered object and a security module is interrupted while an alarm system in the security module embodiment is armed.

The optional security cable 104 in the example of FIG. 1 may be fitted with a security connector adapted to engage a security slot provided on a protected object, although the security cable 104 may attach to the protected object by other means such as a wire loop, clamp, bracket, hook, clip, and/or lock. Many laptop computers and other portable devices include a security slot for receiving a T-shaped post extending from a security connector. In the example of FIG. 1, the security module 102A may attach firmly by a suction cup (not visible in the figure) to a smooth surface 500, for example a countertop, desktop, or similar work surface. An example of a suction cup and related structures will be shown in detail in FIGS. 5-7. The edges and surfaces on a security module embodiment are preferably sufficiently rounded to offer a poor grip for a person's hand, making it difficult to remove the module's hold from the smooth surface 500 after the suction cup establishes an airtight seal against the smooth surface. The optional security cable 104 is preferably flexible enough to coil for storage, yet strong enough to resist breaking or cutting by knives, pliers, scissors, wire cutters, or other sharp objects a person may carry concealed in a pocket. Security module embodiments without a security cable may be even harder to remove from a desktop or other surface than embodiments with a security cable because the cable itself may offer a grip for a person attempting to pull a security module away from a surface.

A security module 102 may pair with a designated client device 212 over the wireless communications link 106. As used herein, a paired connection is a communications channel between two authorized devices. A paired connection preferably resists communications from unpaired devices. Wireless communication links (106A, 106B, 106C) are preferably encrypted and may not be responsive to signals from unpaired devices. In the example of FIG. 1, a first security module 102A may be paired with a first client device 212A represented by a smart phone 300A. Other examples of a client device include, but are not limited to, a tablet computer, a desktop computer, a laptop computer, a wireless key fob, a cellular telephone, a personal digital assistant, a wireless telephone, and a wireless remote control. A client device 212A paired with the security module 102A attached to the protected device 400 by a security cable 104 may be arranged so that the client device monitors the protected device 400 even when the client device 212A is not in close proximity to the protected device 400. For example, a person may need to walk away from a laptop left on a table in a coffee shop or public library while the laptop is secured to a tabletop by the security module and a client device carried by the person is ready to receive status and alarm messages from the security module. A laptop computer may optionally serve as a client 212C for the security module 102A by communicating with the security module over a bidirectional wireless link 106C, whether or not the laptop computer is also the protected device. A client 212 may alternatively communicate with a security module 102 over a wired connection or optical fiber. In some embodiments, a security module may be permitted to pair with more than one device, for example by establishing a first secured wireless communication link 106C with a protected device 400 and a second secured wireless communication link 106A with a separate client device 212A.

The security module 102A may autonomously seek other security modules within communication range of the transceiver to form an ad hoc communications network 230 between security modules 102. Alternatively, the client device 212A paired with the security module 102A may command the security module to initiate a search for other security modules, or the client device 212A may instead prevent its paired security module 102A from seeking other security modules if so desired by a person using the client device and protected device. Some functions performed by a security module, for example arming and disarming an alarm system in the module, modifying a pairing relationship, and possibly other actions and operations, are preferably directed from a paired client device or may be initiated by a controller within a selected security module, but not by other unauthorized and/or unpaired devices.

An ad hoc network 230 may be established by the security module 102A with another security module 102B. The second security module 102B may optionally be paired with another client device 212B represented in the example of FIG. 1 by a second smart phone 300B. The second security module 102B communicates with its client device 212B over another encrypted bidirectional communications link 106B. Each additional security module, represented in FIG. 1 by the second security module 102B, may be tethered to its own protected device, or may optionally participate in an ad hoc network 230 without being tethered. For example, a business establishment may install a security module 102 in an area within wireless communications range of security modules 102 carried by customers, thereby providing for at least one security module for repeating audible and/or visual alarms from customers' modules.

Figure 2:
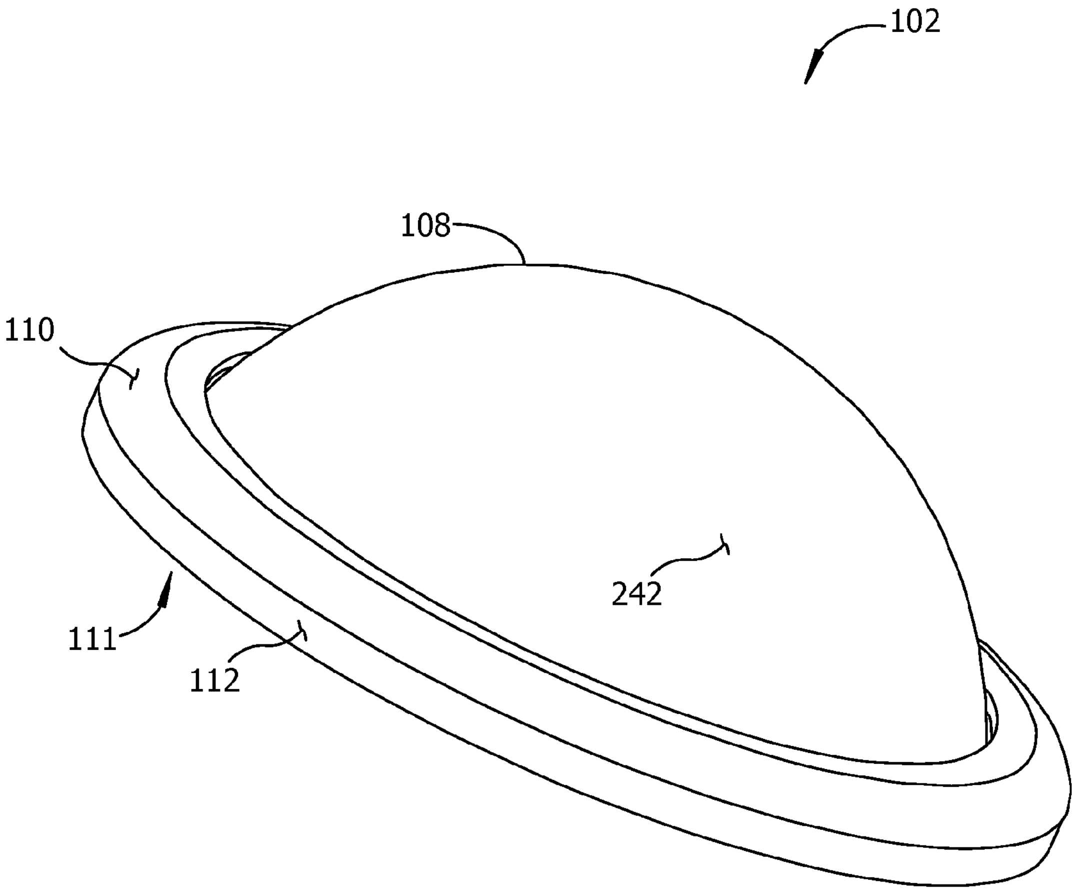
FIG. 2 is a pictorial view toward the top and side of an example of a security module from the security system of FIG. 1.

FIG. 2 shows a pictorial view of an example of a security module 102 having a dome 108 movably engaged with and retained within a guard frame 111. The guard frame 111 includes a dome ring 110 attached to, or alternately formed as an integral part of, a bottom plate 112. A rounded exterior surface 242 on the dome extends outward through an aperture in the dome ring 110. The dome 108 covers a suction cup and other components in the security module, protects electrical components and electrical connections inside the security module from liquid spills, dust, and dirt, and provides a comfortable, but difficult to grip, surface for applying hand pressure to attach the security module to a smooth surface. In the example of FIG. 2, the dome 108 movably engages the dome ring 110 and bottom plate 112, sliding in a void space defined by the dome ring and bottom plate.

Figure 3:
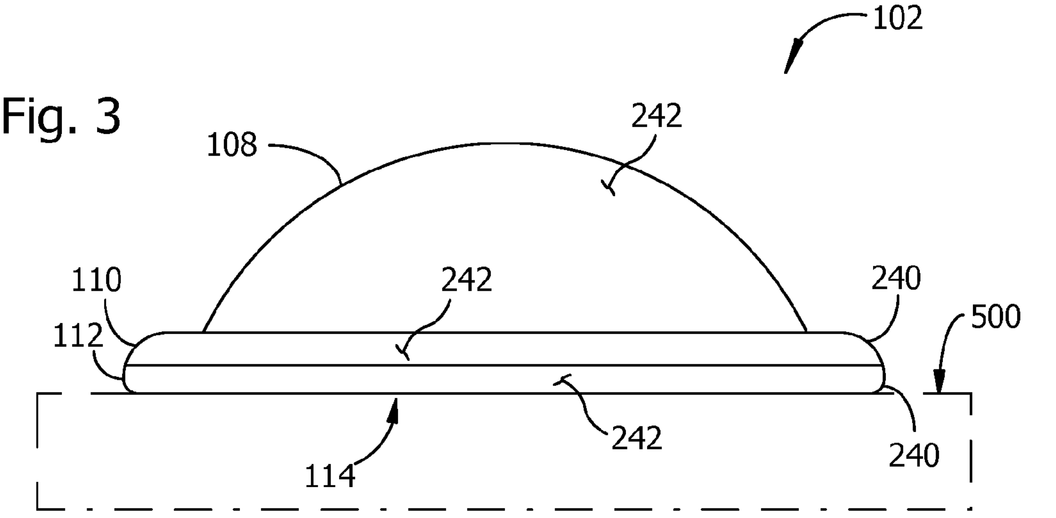
FIG. 3 is a side view of the security module from FIG. 2.

FIG. 3 shows a side view of the example of a security module 102 from FIG. 2, illustrating examples of rounded edges 240 and rounded surfaces 242 shaped to prevent a person getting a firm hand grip on the security module when the module is firmly coupled to a smooth surface 500 with the bottom surface 114 of the bottom plate 112 in close proximity to the smooth surface 500. The surface 242 of the dome 108 may be formed from a slippery material and may optionally be formed with a smooth texture to inhibit getting a firm finger grip on the dome. The example of a security module 102 in FIGS. 2-3 has an approximately circular perimeter shape as shown in the view toward the top of the dome 108 and dome ring 110 in FIG. 4. Alternative embodiments of a security module may be provided with other perimeter shapes, for example a triangular perimeter with rounded vertices, an elliptical perimeter, or other rounded polygonal or irregular shapes.

Figure 4:
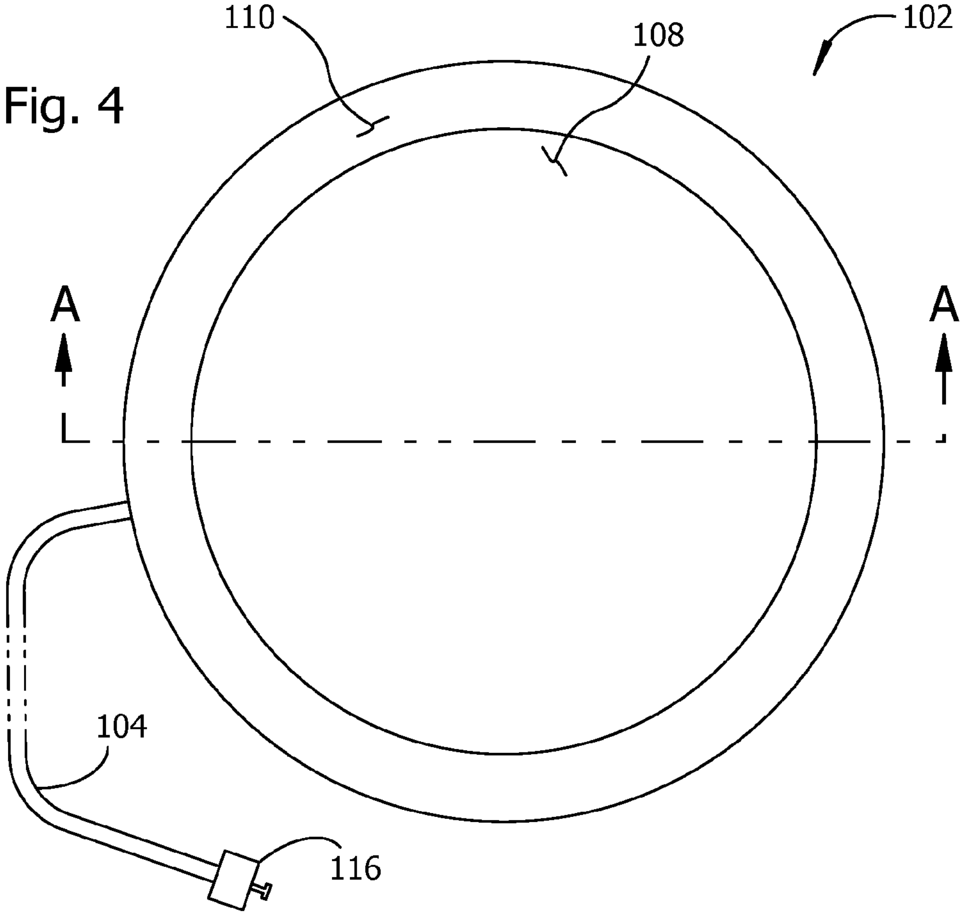
FIG. 4 is a view toward the top side of the security module from FIGS. 2-3.

The example of an optional security cable 104 in FIG. 4 may include a security connector adapted to attach to a corresponding receptacle in a protected device, for example a security connector 116 with a projecting T-shaped post. The security cable may be strongly attached to the security module 102 at an end of the cable opposite the security connector 116. In alternative embodiments, the security connector may be replaced with, for example, a clamp, a holder for a portable electronic device, a loop formed in the cable, or a combination lock with a shackle. An embodiment of a security module may optionally be made with a detachable security cable, for example a security cable that may be disconnected after detaching the security module from a surface 500 and separating the dome ring 110 from the bottom plate 112.

Figure 5:
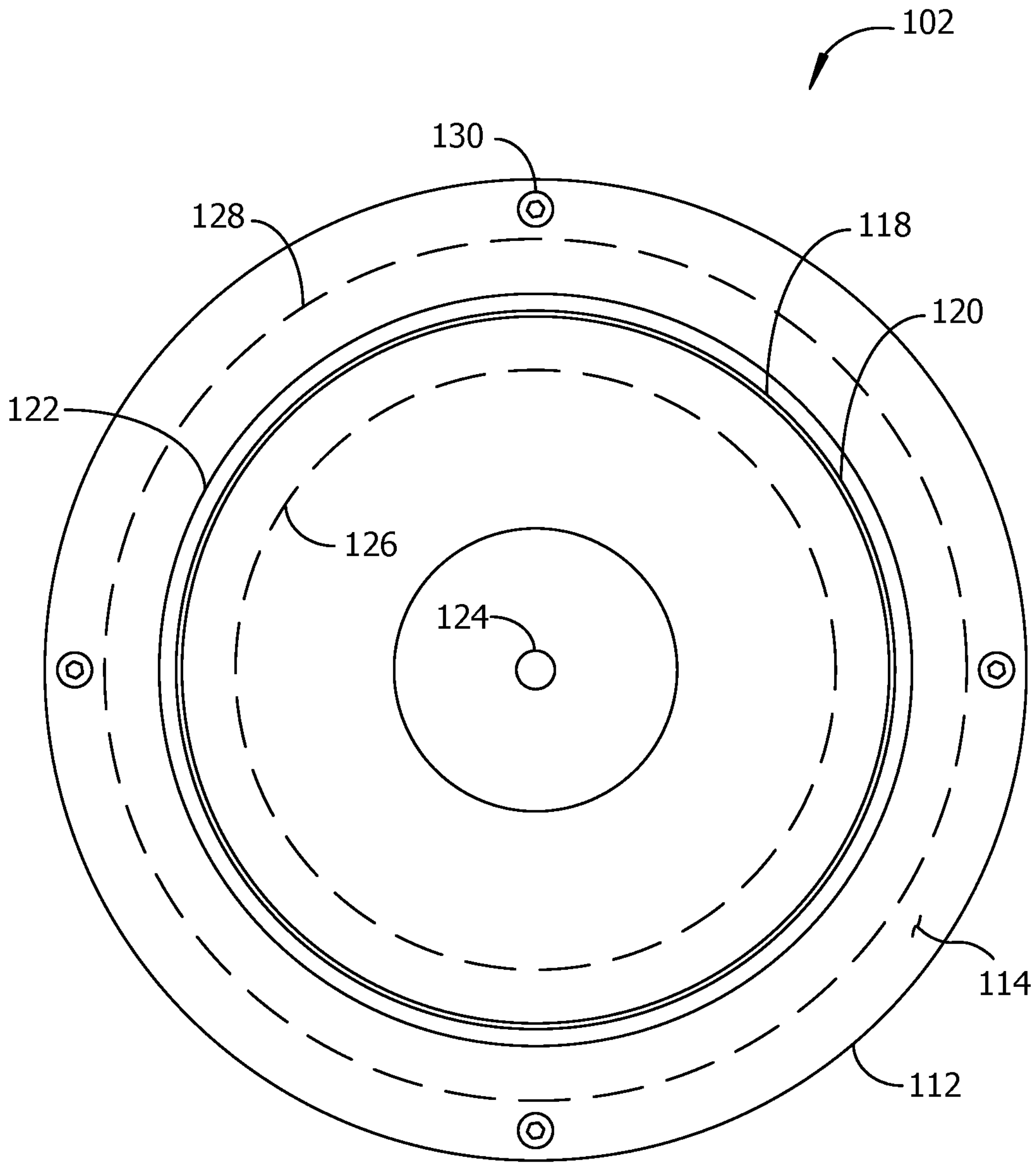
FIG. 5 is a view toward the bottom side of the security module from FIGS. 2-4.

FIG. 5 provides a view toward the bottom side of the example of a security module 102 from FIGS. 1-4, showing the bottom surface 114 of the bottom plate 112, the bottom edge 120 of the suction cup 118, and an inner edge 122 of the bottom plate 112. The bottom plate 112 is part of the guard frame 111. The guard frame 111 is provided to visually obscure the suction cup and to make it difficult for an object such as a finger or screwdriver to contact the suction cup 118 to break a suction grip between the suction cup and a smooth surface. The inner edge 122 of the bottom plate 112 corresponds to an edge of an aperture through which the suction cup 118 extends to seal against an external smooth surface, for example the smooth surface 500 in FIGS. 1 and 3. The outer bottom edge 120 of the suction cup 118 preferably fits entirely within the inner edge 122 of the bottom plate 112 on the guard frame 111. The suction cup 118 is coupled to a retaining plate 126 attached to an interior side 244 of the dome between the suction cup and the top of the dome.

An aperture 124 formed in the suction cup 118 aligns with a corresponding aperture formed in the retaining plate 126, providing a fluid path for air to vent in and out of the suction cup when the suction cup is compressed against a smooth surface, for example by pressing a hand against the exterior surface of the dome with the bottom plate 112 resting against the surface. A latching valve inside the dome closes the fluid path between the suction cup and the atmosphere after the suction cup is compressed against the smooth surface, preventing air from leaking into a space formed between the compressed suction cup and smooth surface and enabling the suction cup to grip the smooth surface. Opening the valve exposes the fluid path to atmospheric pressure, allowing air to enter the space between the compressed suction cup and the smooth surface and releasing the suction cup's grip on the surface.

FIG. 5 shows examples of fasteners 130 for assembling the dome ring to the bottom plate and includes one of several alternative positions for a secondary coil 128 for an optional inductive charging circuit. In the example of FIG. 5, the secondary coil 128 is positioned in the bottom plate 112 behind the bottom surface 114.

Figure 6:
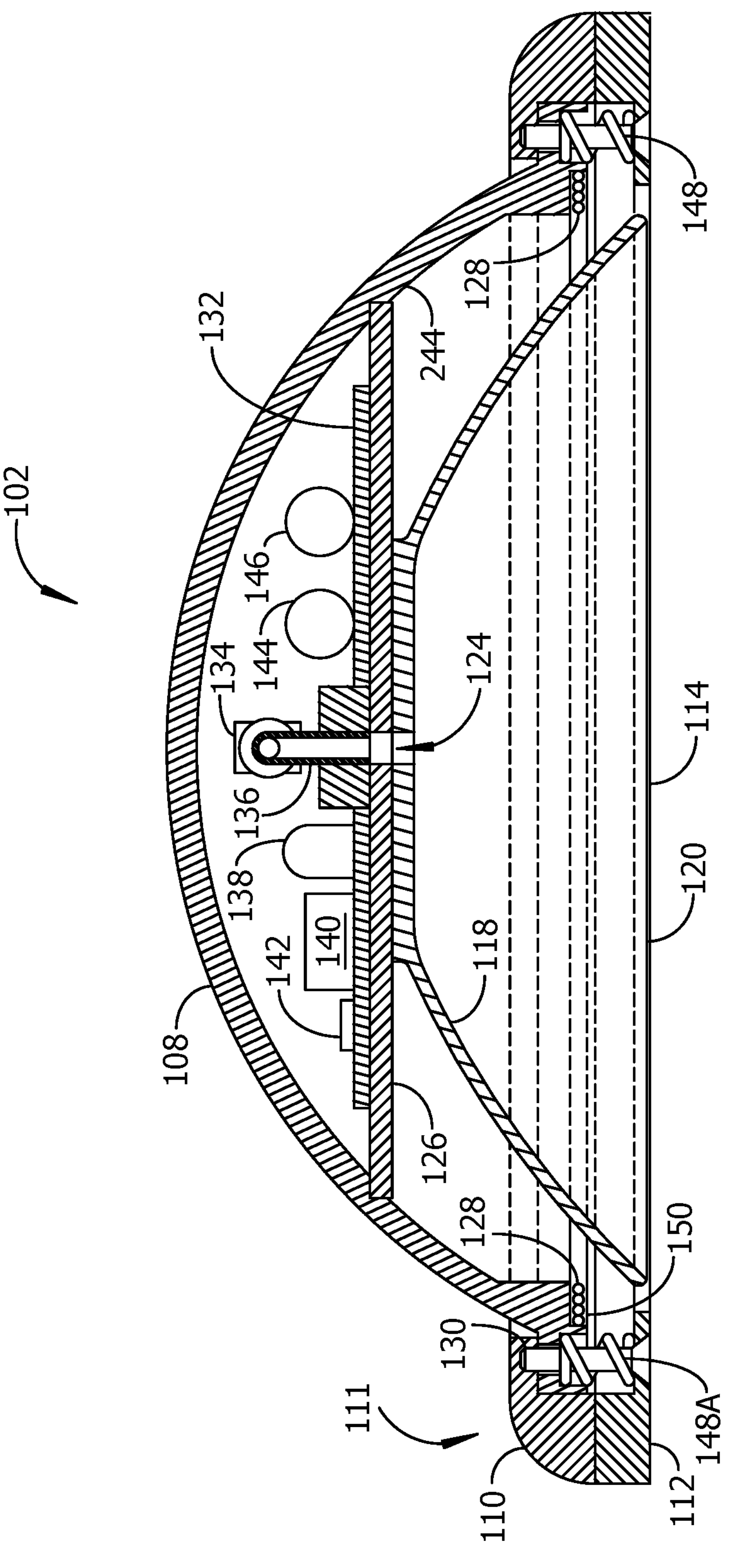
FIG. 6 is a cross-sectional view A-A of the example of a security module from the previous figures. A location and viewing direction for the cross section is marked by line A-A in FIG. 4.

More details of an example of a security module 102 are visible in the cross-sectional view A-A in FIG. 6. The bottom plate 112 and dome ring 110 may be joined by a plurality of fasteners 130 passing through clearance holes in the bottom plate and dome and joined to the dome ring 110. The dome may travel away from the bottom surface 114 or toward the bottom surface 114, sliding along the fasteners 130 in a cavity formed between the dome ring and the bottom surface of the bottom plate. When the bottom surface 114 of the bottom plate 112 is placed against an external surface and the dome 108 pressed toward the surface, a bottom edge 120 of the suction cup 118 contacts the surface, bending the flexible walls of the suction cup, expelling air from the space between the suction cup and the surface, and forming an airtight seal that enables the suction cup to grip the surface firmly. Air may escape from the space between the suction cup and the smooth surface by venting around the bottom edge 120 of the suction cup or by venting through a fluid path formed by apertures 124 in the suction cup 118, retaining plate 126, hollow tubing 136, and latching valve 134, all of which are in fluid communication with one another.

The suction cup and other moving parts of the security module are preferably made from materials capable of withstanding many hundreds of cycles of attachment to and detachment from smooth surfaces. The suction cup 118 may be formed with a diameter across its outer edge 120 large enough to hold the security module against a smooth surface with sufficient force to deter efforts by an adult male with average hand grip strength to detach the security module from the surface without the use of a lever or other tool. For example, a suction cup with an outer edge 120 diameter of about 1.5 inches may be calculated to withstand a pull normal to a smooth surface to which the suction cup is attached of about 25 pounds force before the suction cup releases from the surface. Doubling the outer edge diameter 120 from 1.5 inches to 3 inches raises the force needed to overcome the suction cup's grip by the square of the increase in radius, to over 100 pounds force. As suggested by these calculated force values, even a relatively small suction cup may be very effective in deterring removal of a security module from a smooth surface, especially when the dome and guard ring of the security module are smooth and slippery to interfere with a firm hand grip on the dome. In some embodiments, the outer edge diameter 120 of the suction cup is about 3 inches, although alternative embodiments may be made with a suction cup outer edge diameter value in a range from about 1 inch to about 6 inches.

Returning to the example of FIG. 6, a spring 148 retained by a fastener 130 urges a bottom edge 150 of the dome 108 away from the bottom surface 114 of the bottom plate 112. In the example of FIG. 6, the dome is displaced to its maximum separation between its bottom edge 150 and the bottom surface 114 of the bottom plate 112, and the spring 148A is in its least compressed state. The springs 148 provide tactile feedback for a person pressing the dome downward, providing an indication that the magnitude of hand pressure being applied to the dome is sufficient to firmly attach the suction cup to a smooth surface without causing damage to the dome. The springs 148 return the dome to a rest position with the dome 108 in contact with the dome ring 110 after the suction cup releases its grip on a smooth surface.

In some embodiments, a secondary coil 128 for an optional inductive charger may be attached to the dome near the dome's bottom edge 150, moving up and down with the dome relative to the dome ring and bottom plate. As suggested in FIGS. 6, 7, and 10, the secondary coil 128 may comprise turns of wire electrically connected to a circuit card assembly 132 supported by the retaining plate 126. The circuit card assembly 132 includes an alarm system 234 with a controller 142, an audible alarm transducer 140, a visual alarm indicator 138, a controller power supply 174, a latching valve 134, and optionally, a solenoid power supply 178. In an alternative embodiment, the controller and latching valve may be operated from a single power supply. Examples of an audible alarm transducer include, but are not limited to, an electromechanical speaker, a piezoelectric audio emitter, a bell, and a buzzer.

The dome 108 may optionally be formed from a material that is partially transparent to visible light frequencies, permitting light emitted from the visual alarm indicator 138 to illuminate the interior surface of the dome and to be visible from outside the dome. Examples of a visual alarm indicator include, but are not limited to, an incandescent lamp, a fluorescent lamp, a light emitting diode (LED), and an electroluminescent (EL) panel. The visual alarm indicator may optionally emit pulses of light, with different pulse patterns corresponding to different alarm conditions, or alternatively different colors of light, with a selected color assigned to each alarm or other status condition. For example, a dome illuminated by a flashing red light may indicate an alarm condition corresponding to a security module having been pulled from a smooth surface after the suction cup established a suction grip against the surface and the security system was armed. A different red flashing pattern may indicated an alarm message for another security module in the vicinity has been received. A green-illuminated dome may indicate an armed or standby state. Different combinations of color and flashing pattern may optionally be used to represent different status and alarm conditions and may further distinguish a security module originating an alarm signal from a security module repeating an alarm signal received from another security module.

Figure 7:
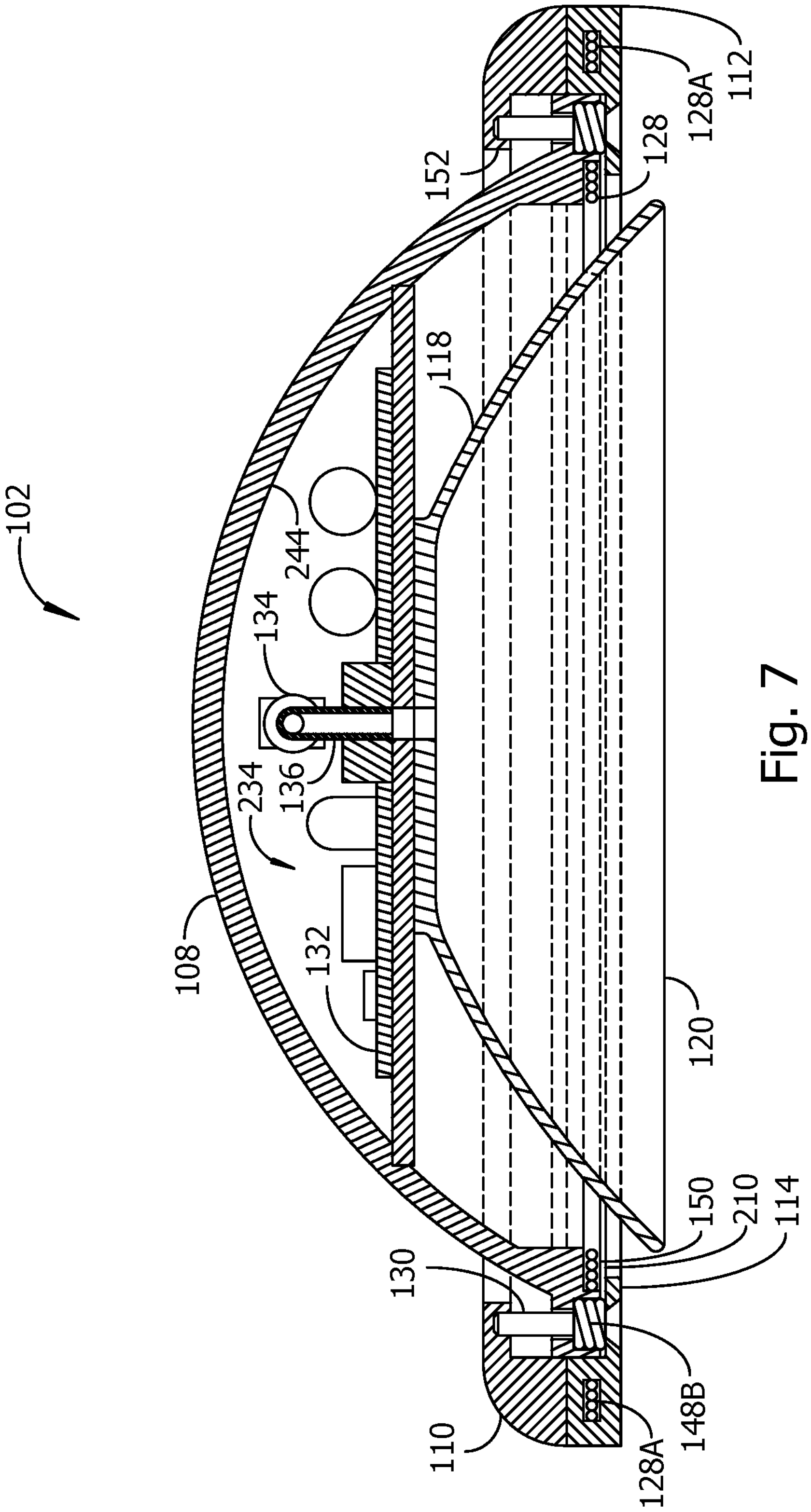
FIG. 7 is an alternative cross-sectional view A-A of the security module from the previous figures, showing a displacement of the dome downward, toward a bottom exterior surface of the security module.

FIG. 7 shows an alternative view of cross-section A-A in which the dome is pressed downward, compressing the springs 148B and displacing the bottom edge 150 of the dome 108 toward the bottom surface 114 of the bottom plate 112 and displacing the bottom edge 120 of the suction cup 118 outward from the bottom plate 112, toward a surface to be gripped by the suction cup. Pressing the dome downward may open a gap between the outer top surface of the dome 108 and an edge 152 defining an aperture in the dome ring 110 through which the dome extends. When the bottom surface 114 of the bottom plate 112 is not in contact with an external surface and the dome 108 is pressed toward the bottom surface 114, the bottom edge 120 of the suction cup 118 may extend outward from the bottom surface 114. Removing a compression force applied against the dome's outer surface allows the dome to return to its rest position and retracts the bottom edge 120 of the suction cup into the bottom plate when the suction cup is not attached to an external surface. When the bottom surface 114 of the bottom plate 112 is in contact with an external smooth surface, the suction cup, rather than extending outward as suggested in FIG. 7, will instead compress and form a seal against the smooth surface, with the bottom edge 120 of the suction cup extending slightly beyond the bottom surface 114 of the bottom plate 120 and some of the air between the suction cup and the smooth surface vented to the atmosphere to establish a suction grip against the surface. Closing the latching valve 134 sustains the suction cup's suction grip against the smooth surface. Opening the latching valve 134 releases the suction cup's suction grip against the external smooth surface. Breaking the suction cup's suction grip from a smooth surface may open the latching valve 134.

An optional pressure sensor in fluid communication with the suction cup may detect when the suction cup has established a suction grip against a smooth surface. The controller may receive an electrical signal from the pressure sensor to determine when the suction cup has established a suction grip against a surface and to determine when the suction cup has released its suction grip.

Some embodiments 100 include an inductive charger 154. The secondary coil 128 for receiving energy from the charger may be coupled to the dome, for example near the interior surface of the dome and above an inner bottom surface 210 of the bottom plate 114 as suggested in FIGS. 6 and 7. FIG. 7 further shows an alternative position for the secondary coil, in which the secondary coil 128A is coupled to the bottom plate, between the dome ring 110 and the bottom surface 114 of the bottom plate 112.

Figure 8:
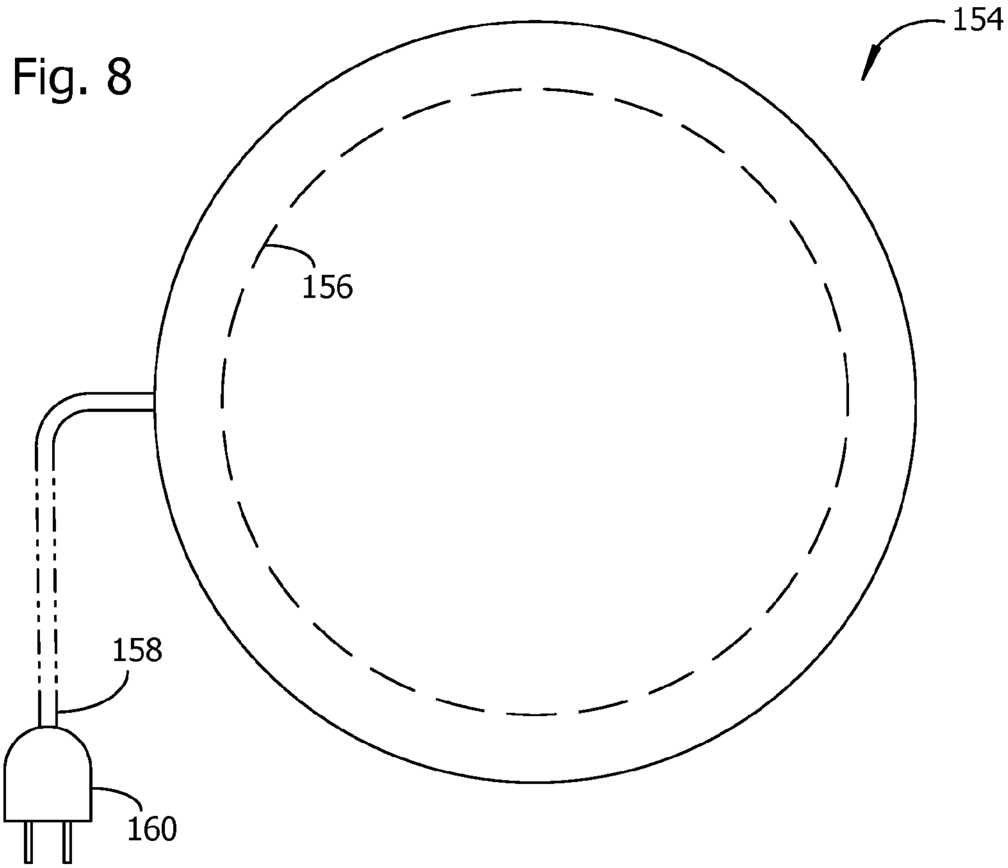
FIG. 8 is a view toward a top side of an example of an inductive charger for providing electrical power to a power supply inside a security module.
Figure 9:
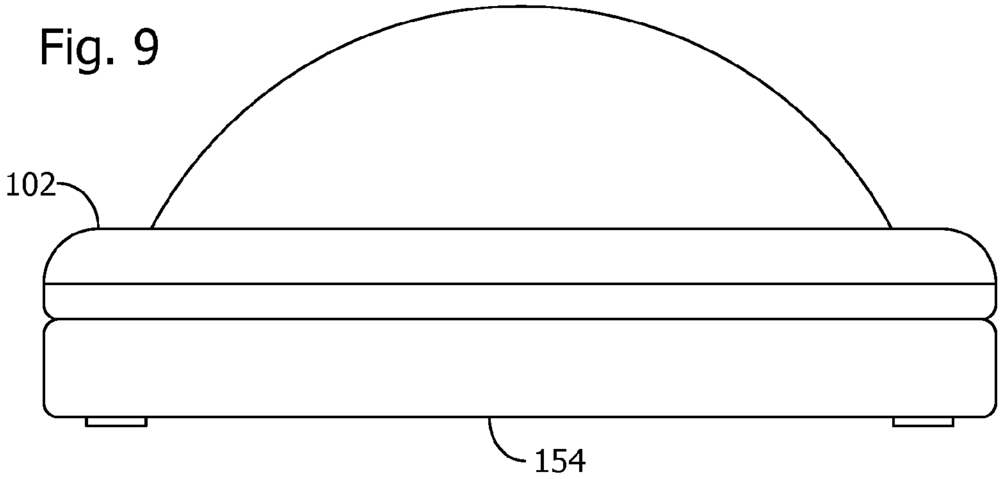
FIG. 9 is a side view of an example of a security module resting on top of the inductive charger from FIG. 8.

The optional inductive charger couples electrical power into the controller power supply 144 and the solenoid power supply 146. An example of an inductive charger is shown in a view toward a top surface of the charger 154 in FIG. 8 and toward a side of the charger 154 in FIG. 9. An electrical power input cable 158 with an electrical connector 160 is mechanically connected to a housing for the inductive charger 154 and electrically connected to a primary coil 156 in the charger. FIG. 9 shows an example of a security module 102 placed on top of an inductive charger 154 for coupling power into the controller power supply and solenoid power supply in the security module. Examples of a controller power supply and a solenoid power supply include, but are not limited to, an electric storage battery, a rechargeable electric storage battery, and a device storing electrical energy in one or more capacitors.

Figure 10:
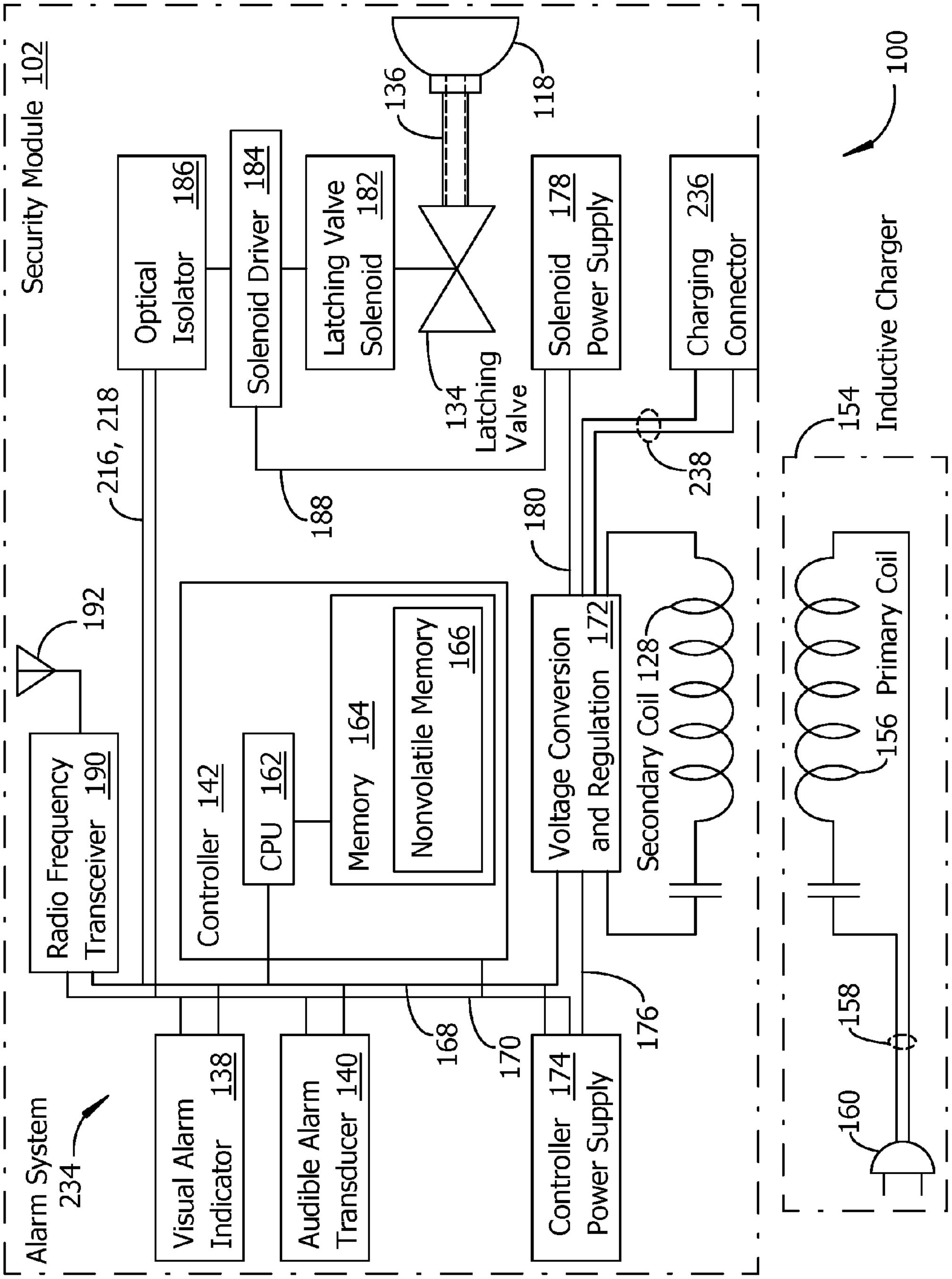
FIG. 10 is a block diagram representing an example of hardware components and electrical connections included with the example of a security module from the previous figures, further including an inductive charger in a security system embodiment.

FIG. 10 shows examples of some components included with a security system 100 comprising a security module 102 and an optional inductive charger 154. The suction cup 118 in the security module 102 is coupled for fluid communication with a latching valve 134, optionally through intervening tubing 136. Alternatively, the suction cup may be attached directly to the latching valve. Closing the latching valve 134 after pressing the suction cup against a smooth surface enables the suction cup 118 to establish a strong suction grip against the smooth surface. Opening the latching valve releases the suction cup's grip against the smooth surface. A latching valve solenoid 182 changes the latching valve 134 from a closed state in which air does not flow though the valve to an open state in which air may flow through the valve. A solenoid driver 184 electrically connected to the latching valve solenoid 182 receives an electrical signal from a controller 142 through an intervening optical isolator 186 to open or close the latching valve 134. Electrical power for operating the solenoid driver 184 and latching valve solenoid 184 are provided by a solenoid power supply 178 over a power connection 188. The solenoid driver 184 may optionally transmit a valve status signal 218 to the controller 142 to indicate the open or closed status of the latching valve 134.

The controller 142 is a combination of hardware devices performing monitoring and control functions related to operation and status of the latching valve 134. The controller 142 is part of the circuit card assembly 132 shown in the examples of FIGS. 6-7. A controller 142 includes a central processing unit (CPU) 162 in data communication with other components over a bidirectional control bus 168, including a radio frequency transceiver 190, a visual alarm status indicator 138, and an audible alarm status indicator 140. A memory 164 and nonvolatile memory 166 are connected for data communication with the CPU 162. Examples of a CPU 162 include a microcontroller implemented as a hardware device, a microprocessor implemented as a hardware device, and a group of interconnected semiconductor devices operating as the CPU 162 on an integrated circuit die in a gate array, application specific integrated circuit (ASIC), or programmable logic device.

The controller 142 sends and receives alarm messages and other data and commands representative of status of the security module 102 and possibly other security modules within communication range of a radio frequency transceiver 190 in the security module 102. The radio frequency transceiver 190 is electrically connected to an antenna 192 for sending and receiving radio frequency signals from transceivers in other devices The controller 142 may receive a valve status signal 216 following an interrupt signal from the solenoid driver 184. For example, the latching valve 134 may close automatically when the suction cup 118 is compressed against a smooth surface, and the solenoid driver may signal the closed status of the valve to the controller. Or, the controller 142 may poll the solenoid driver 184 to request the status of the latching valve 134 after the controller commands the latching valve to either close or open. The controller may optionally command the latching valve to either close or open by transmitting a corresponding valve command 216 to the solenoid driver 184 in response to a related command received through the radio frequency transceiver 190 from a client device paired with the security module 102.

The controller 142 may receive electrical power from a power distribution bus 170 electrically connected to a controller power supply 174. The controller power supply 174 receives electrical power from a voltage conversion and regulation circuit 172 over a charging line 176. The voltage conversion and regulation circuit 172 may optionally be electrically connected to the secondary coil 128 in the security module 102. The secondary coil 128 may receive inductively coupled electrical energy from a primary coil 156 in the inductive charger 154 when the security module 102 and inductive charger 156 are in close physical proximity to one another. The voltage conversion and regulation circuit 172 also provides electrical power to the optional solenoid power supply 178 over another charging line 180. The voltage conversion and regulation circuit may be electrically connected to a charging connector 236 for receiving electrical power over at least two electrical conductors 238 from an external electrical power source. Examples of a charging connector include, but are not limited to, a USB-A connector, a USB-B connector, a micro USB-A connector, a micro USB-B connector, a USB mini connector, or another electrical connector having at least two conductors for carrying electrical power. When an embodiment is used to protect a device with USB ports such as a laptop computer, the charging connector may be connected by an electrical cable to a USB port to provide electrical power to the security module 102.

Figure 12:
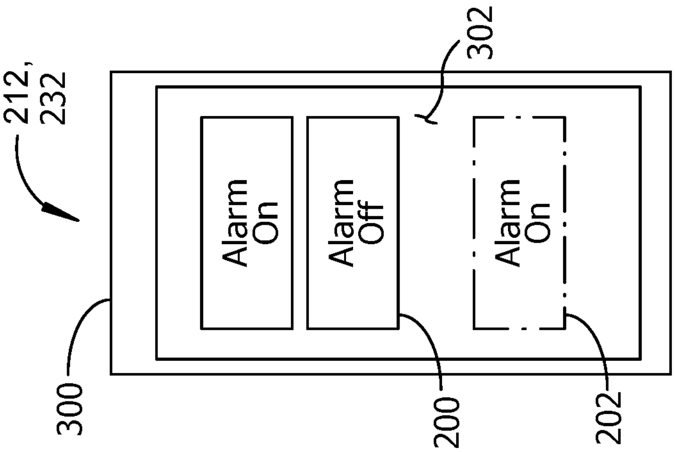
FIG. 12 continues the example of FIG. 11, showing more examples of activators for controlling an embodiment, and further illustrating examples of messages relating to operational status of a security system embodiment.
Figure 11:
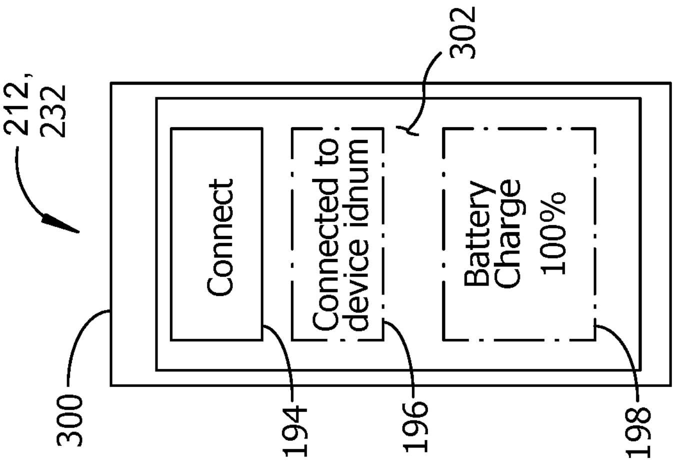
FIG. 11 is a view toward the display of a smart phone, an example of a client device running a client application for a security system embodiment, showing some examples of activators for controlling the security system and messages relating to operational status of the security system.
Figure 14:
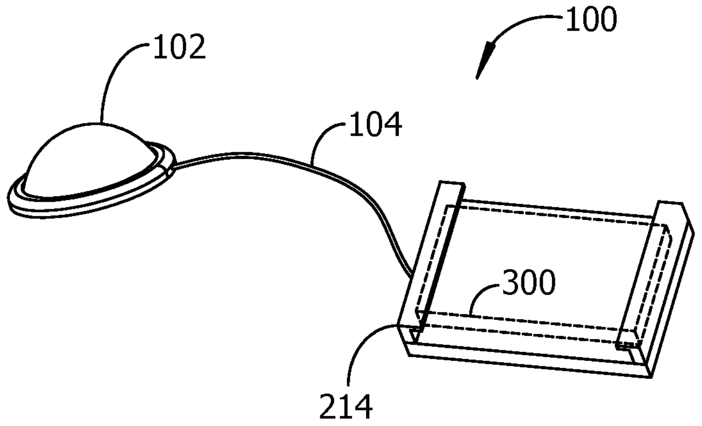
FIG. 14 shows an example of an embodiment including a security cradle for holding a personal electronic device lacking a security slot.

An embodiment of a security system 100 optionally includes a client application comprising software instructions and data stored in a nonvolatile memory in a client device. Examples of features and operations performed by a client application are shown in the examples of a client application for a smart phone 300 in FIGS. 11-13. In the example of FIG. 11, a client application 232 running on a client device 212 may be paired with a designated security module by selecting a connect activator 194 on the client device's display screen 302, perhaps by touching the screen with a stylus or fingertip or with a keypress on a keypad. The connect activator 194 causes the client device 212 and the designated security module, for example one of the security modules 102 in the examples of FIGS. 1-10, to establish a wireless communication link in a pairing relationship.

As used herein, an activator refers to a device for producing a selection indication when the activator is selected by a person. Examples of an activator include, but are not limited to, a keypad on a keyboard, smart phone, or similar device, a touch target on a touch-active display, for example a liquid crystal display with a capacitive touch overlay, a resistive touch overlay, a surface acoustic wave sensor, or an infrared touch input system, a re-assignable or "special function" key on a keypad, keyboard, or computer display, or a designated alphanumeric key on a keypad or keyboard.

Continuing with FIG. 11, the client application 232 may display a status message after pairing is established, for example a status message 196 indicating a connection to a security module with a displayed identification number"id-num". Other status messages, for example, but not limited to, a battery charge estimate 198, an identification name assigned to a security module, perhaps as a user-assigned alias, a reminder to arm a security module, a reminder to disarm a security module before attempting to detach the module from an external object, or other status messages may be displayed by the client application 232 on the display 302 of the client device 212, for those client devices having a display.

After a client device and a security module are paired with one another, the client application 232 may optionally present a choice to arm or disarm an alarm system in a security module to establish protection of a tethered object. The alarm system may be turned on or off at the discretion of a person using the client device 212 by selecting one or more activators 200, as in FIG. 12. An alarm status message 202 may be generated by the client application 232 in response to a selection of an activator.

Figure 13:
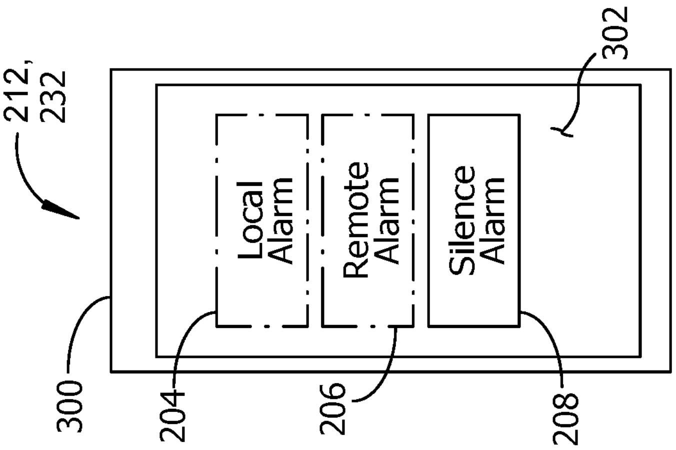
FIG. 13 continues the example of FIGS. 11-12, showing additional examples of activators and messages which may be available on a client device.

FIG. 13 shows an example of messages and activators that may optionally be presented when the controller in a security module 102 transmits an alarm message to a paired client device 212. The client application may display a message 204 for a local alarm, that is, an alarm originating in the security module 102 paired with the client device 212. If an alarm originates in another security module 102, the client application 232 may display a message 206 for a remote alarm condition, encouraging the person using the client device to search for another security module transmitting an audible and/or visual alarm signal. An activator 208 may be provided for silencing audible and/or visual alarm signals.

Some examples of a security module may include an optional security cable 104 attached to a cradle 214 for securely holding a personal electronic device such as a smart phone 300 or a tablet computer. Alternatively, the cradle 214 may be provided with a security slot like those found on many laptop computers, and the cradle connected to a security module by a cable with a security connector, for example the security connector from the example of FIG. 4.

Figure 15:
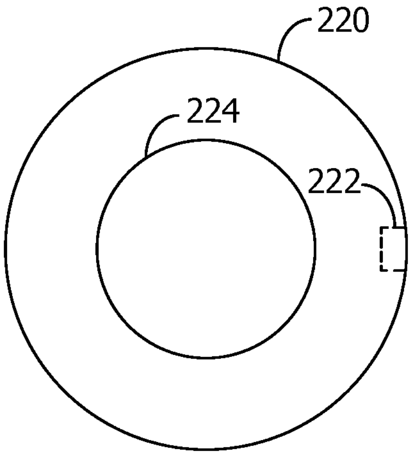
FIG. 15 shows a view toward a front surface of an example of an adapter plate for providing a security slot on objects that do not include their own security slot.
Figure 16:
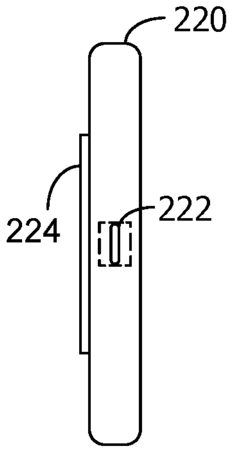
FIG. 16 is a view toward the side of the adapter plate of FIG. 15, showing an example of a security slot for receiving a connector on a security cable attached to a security module.
Figure 17:
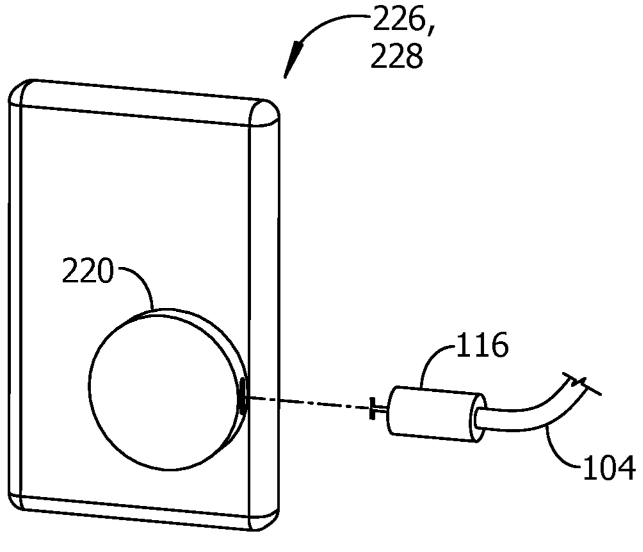
FIG. 17 shows an example of the adapter plate of FIGS. 15-16 attached to an object lacking its own security slot.

Some objects to be protected by tethering to a security module may not include a security slot for receiving a security connector on a security cable. FIG. 15 shows a view toward a surface of an adapter plate 220 having a security slot 222 formed in the plate. FIG. 16 shows a side view toward the security slot 222 of the adapter plate 220 from the example of FIG. 15. FIGS. 15-16 further illustrate an example of an adhesive pad 224 for attaching the adapter plate to an object to be protected by tethering to a security module, for example the object 226 in FIG. 17. The object 226 in FIG. 17 represents an example of a smart phone or other personal electronic device that was not manufactured with its own security slot. An adapter plate 220 attached to the object 226, for example by a strong adhesive pad 224, enables the object 226 to be tethered by a security cable 104 to a security module with a security connector 116 engaging the security slot 222 in the adapter plate.

FIG. 17 alternatively represents an example of a protective case 228 for a personal electronic device. Some smart phones, tablet computers, and other devices may be placed in a protective case to prevent scratches and impact damage to the device. A protective case may be close-fitting and somewhat difficult to remove after the device is installed in the case. The example of an adapter plate 220 from FIGS. 15-16 may be attached to the protective case as suggested in FIG. 17 to tether the case and the personal electronics device held in the case to a security module.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:

a security module, comprising:

a guard frame;

a dome slidably engaged with said guard frame;

an alarm system coupled to said dome, said alarm system comprising a controller and a radio frequency transceiver connected for data communication with said controller;

a valve in fluid communication with a suction cup and electrically connected to said controller, said suction cup coupled to said dome, said suction cup in fluid communication with said valve; and a client application comprising software instructions for arming said alarm system, disarming said alarm system, and opening said valve.

2. The apparatus of claim 1, wherein a displacement of said dome toward a bottom surface of said guard frame extends a bottom edge of said suction cup outward from said bottom surface of said guard frame.

3. The apparatus of claim 2, further comprising a spring disposed between said bottom surface of said guard frame and said dome, said spring urging a displacement of said dome away from said bottom surface of said guard frame, thereby retracting said suction cup into said guard frame.

4. The apparatus of claim 1, wherein said valve closes when said suction cup seals against a smooth surface.

5. The apparatus of claim 1, wherein said valve opens when said suction cup releases a suction grip against a smooth surface.

6. The apparatus of claim 5, wherein said controller transmits an alarm message over said transceiver when said alarm system is armed and said valve opens.

7. The apparatus of claim 5, wherein said alarm system further comprises:

a visual alarm indicator electrically connected to said controller; and an audible alarm transducer electrically connected to said controller, and said controller activates said visual alarm indicator and/or said audible alarm indicator when said alarm system is armed and said valve opens.

8. The apparatus of claim 1, wherein said alarm system further comprises:

a visual alarm indicator electrically connected to said controller; and an audible alarm transducer electrically connected to said controller, and said controller activates said visual alarm indicator and/or said audible alarm indicator when said controller receives an alarm message from said transceiver.

9. The apparatus of claim 1, wherein said security module further comprises a voltage conversion and regulation circuit electrically connected to said controller, said voltage conversion and regulation circuit including a secondary coil positioned to receive inductively coupled power from an inductive charger.

10. The apparatus of claim 9, further including said inductive charger.

11. The apparatus of claim 1, further comprising:

an optical isolator electrically connected to said controller; and a solenoid driver electrically connected to said optical isolator and to said valve, wherein said valve opens and closes in response to signals sent from said controller through said optical isolator and said solenoid driver.

12. The apparatus of claim 1, wherein said controller transmits over said transceiver an alarm message received from another of said security module.

13. The apparatus of claim 1, wherein said client application includes a connect activator for establishing secure communications with a selected one of said security module.

14. The apparatus of claim 1, wherein said client application includes an alarm system activator for arming said alarm system and an activator for silencing an alarm.

15. The apparatus of claim 1, wherein said client application includes a local alarm message indication and a remote alarm message indication.

16. The apparatus of claim 1, further comprising a flexible security cable attached to said guard frame.

17. The apparatus of claim 16, wherein said security cable further comprises a security connector adapted to couple to a corresponding security slot on an object to be secured.

18. The apparatus of claim 17, further comprising an adapter plate including an adhesive pad for attaching said adapter plate to an object to be protected, wherein said adapter plate is formed with a security slot adapted to receive said security connector.

19. The apparatus of claim 16, wherein said security cable further comprises a cradle adapted for securely holding a portable electronic device.

20. The apparatus of claim 1, wherein said security module autonomously links to another of said security module through said transceiver.

* * * * *